US006163330A

United States Patent [19]
Hideshima

[11] Patent Number: 6,163,330
[45] Date of Patent: Dec. 19, 2000

[54] IMAGE SCANNING AND RECORDING APPARATUS

[75] Inventor: Takahiro Hideshima, Minamiashigara, Japan

[73] Assignee: Fuji Photo Film Co., Ltd., Kanagawa-ken, Japan

[21] Appl. No.: 09/140,670

[22] Filed: Aug. 26, 1998

[30] Foreign Application Priority Data

Aug. 27, 1997 [JP] Japan .................................. 9-231263

[51] Int. Cl.⁷ .................................................. B41J 2/435
[52] U.S. Cl. ........................................ 347/233; 347/234
[58] Field of Search ................................... 347/233, 225, 347/234, 255

[56] References Cited

U.S. PATENT DOCUMENTS

| | | | |
|---|---|---|---|
| 3,783,185 | 1/1974 | Spaulding | 178/5.2 |
| 3,971,044 | 7/1976 | Findley et al. | 354/9 |
| 5,241,329 | 8/1993 | Guerin | 346/108 |
| 5,471,236 | 11/1995 | Ito | 347/233 |
| 5,578,819 | 11/1996 | Kataoka et al. | 250/235 |
| 5,973,746 | 10/1999 | Nakamoto et al. | 348/458 |

*Primary Examiner*—N. Le
*Assistant Examiner*—Lamson D. Nguyen
*Attorney, Agent, or Firm*—Sughrue, Mion, Zinn, Macpeak & Seas PLLC

[57] ABSTRACT

There is established a process of writing line data into and reading line data from line buffers when a film which is being fed in an auxiliary scanning direction is scanned in a main scanning direction in an interlaced scanning fashion with n recording beams that are emitted from an acoustooptic modulator based on simultaneously supplied n line data. It is assumed that the n line data transferred to channels CH1–CHn of the acoustooptic modulator have respective sequential numbers N (N=1–n). If the line data in a channel CHN exposed in a preceding scanning cycle is stored in any of the line buffers, then the line data of a sequential number N is written into that line buffer. If there is no line data in a channel CHN exposed in a preceding scanning cycle, then the line data of a sequential number N is written into a line buffer according to its sequence by referring to a write sequence table. The n line data are simultaneously read from the line buffers according to a read sequence table and transferred to the channels CH1–CHn of the acoustooptic modulator.

7 Claims, 10 Drawing Sheets

Table 56:

| LINE SYNC SIGNAL COUNT \ LINE BUFFER | B1 | B2 | B3 | B4 | B5 | B6 | B7 | B8 | B9 | B10 | B11 |
|---|---|---|---|---|---|---|---|---|---|---|---|
| 1~4 | 1 | 2 | 3 | 4 | | | | | | | |
| 5~8 | ↑ | ↑ | → | ↑ | 5 | 6 | 7 | 8 | | | |
| 9~12 | 11 | 14 | 17 | 12 | 15 | → | → | ↑ | 9 | 10 | |
| 13~16 | → | → | ↑ | ↑ | → | 18 | → | 16 | ↑ | → | 13 |
| 17~20 | ↑ | ↑ | 27 | 20 | → | → | 21 | ↑ | 19 | → | → |
| 21~24 | 25 | 26 | → | ↑ | 29 | 30 | → | 24 | → | 22 | 23 |
| 25~28 | ↑ | ↑ | ↑ | 28 | ↑ | → | 31 | ↑ | → | → | → |
| 29~32 | 35 | 38 | 41 | 36 | 39 | → | → | 32 | 33 | 34 | → |
| 33~36 | → | → | ↑ | ↑ | → | 42 | → | ↑ | → | → | 37 |
| 37~40 | ↑ | ↑ | ↑ | 44 | ↑ | → | 45 | 40 | 43 | → | → |
| 41~44 | 49 | 50 | 51 | 52 | 53 | 54 | → | ↑ | → | 46 | 47 |
| 45~48 | ↑ | ↑ | ↑ | ↑ | ↑ | → | 55 | 48 | → | → | → |
| 49~52 | 59 | 62 | 65 | 60 | 63 | 66 | 69 | 56 | 57 | 58 | → |
| 53~56 | → | → | ↑ | 68 | ↑ | ↑ | ↑ | ↑ | → | → | → |
| 57~60 | ↑ | ↑ | 75 | 76 | 77 | 78 | 79 | 64 | 67 | 70 | 71 |
| 61~64 | 73 | 74 | → | ↑ | ↑ | ↑ | ↑ | 72 | → | → | → |
| 65~68 | ↑ | → | → | ↑ | ↑ | ↑ | ↑ | ↑ | ↑ | ↑ | → |
| 69~72 | → | → | → | → | → | → | → | 80 | ↑ | ↑ | ↑ |
| 73~76 | | | | | | | | | | | |
| 77~80 | | | | | | | | | | | |

→ OUTPUTTING DATA    ↑ HOLDING DATA

Table 66:

| CHANNEL NO. \ SCANNING CYCLE COUNT | CH1 | CH2 | CH3 | CH4 |
|---|---|---|---|---|
| 1 | X | X | X | X |
| 2 | X | X | 1 | 4 |
| 3 | 3 | 2 | 5 | 8 |
| 4 | 7 | 6 | 9 | 12 |
| 5 | 11 | 10 | 13 | 16 |
| 6 | 15 | 14 | 17 | 20 |
| 7 | 19 | 18 | 21 | 24 |
| 8 | 23 | 22 | 25 | 28 |
| 9 | 27 | 26 | 29 | 32 |
| 10 | 31 | 30 | 33 | 36 |
| 11 | 35 | 34 | 37 | 40 |
| 12 | 39 | 38 | 41 | 44 |
| 13 | 43 | 42 | 45 | 48 |
| 14 | 47 | 46 | 49 | 52 |
| 15 | 51 | 50 | 53 | 56 |
| 16 | 55 | 54 | 57 | 60 |
| 17 | 59 | 58 | 61 | 64 |
| 18 | 63 | 62 | 65 | 68 |
| 19 | 67 | 66 | 69 | 72 |
| 20 | 71 | 70 | 73 | 76 |

EXPOSURE SCANNING SEQUENCE TABLE

| SCANNING CYCLES | CH(BEAM) | --→ NON-EXPOSURE  →EXPOSURE | SCANNING LINE NO. (SCANNING LINE POSITION) |
|---|---|---|---|
| 1 | 1 | --------→ | |
| 1 | 2 | --------→ | |
| 2 | 1 | --------→ | |
| 1 | 3 | --------→ | |
| 2 | 2 | ————→ | 1 |
| 3 | 1 | ————→ | 2 |
| 2 | 3 | ————→ | 3 |
| 3 | 2 | ————→ | 4 |
| 4 | 1 | ————→ | 5 |
| 3 | 3 | ————→ | 6 |
| 4 | 2 | ————→ | 7 |
| 5 | 1 | ————→ | 8 |
| 4 | 3 | ————→ | 9 |
| 5 | 2 | ————→ | 10 |
| 6 | 1 | ————→ | 11 |
| 5 | 3 | ————→ | 12 |
| 6 | 2 | ————→ | 13 |
| 7 | 1 | ————→ | 14 |
| 6 | 3 | ————→ | 15 |
| 7 | 2 | ————→ | 16 |
| 8 | 1 | ————→ | 17 |
| 7 | 3 | ————→ | 18 |
| 8 | 2 | ————→ | 19 |
| 9 | 1 | ————→ | 20 |
| 8 | 3 | ————→ | 21 |
| 9 | 2 | ————→ | 22 |
| 9 | 3 | ————→ | 24 |

| FIFO MEMORY / LINE SYNC SIGNAL COUNT | B1 | B2 | B3 | B4 | B5 | B6 | B7 | B8 | B9 | B10 | B11 | B12 |
|---|---|---|---|---|---|---|---|---|---|---|---|---|
| 1~5 | 1 | 2 | 3 | 4 | 5 | | | | | | | |
| 6~10 | ↑ | → | ↑ | → | ↑ | 6 | 7 | 8 | 9 | 10 | | |
| 11~15 | 13 | 16 | 14 | 17 | 15 | ↑ | ↑ | ↑ | ↑ | ↑ | 11 | 12 |
| 16~20 | 24 | → | ↑ | → | ↑ | 18 | → | 19 | → | 20 | ↑ | → |
| 21~25 | → | 28 | 27 | 31 | 25 | 29 | 21 | ↑ | 22 | ↑ | 23 | 26 |
| 26~30 | ↑ | ↑ | → | ↑ | ↑ | → | ↑ | 32 | → | 30 | ↑ | → |
| 31~35 | 37 | 39 | 41 | 43 | 35 | 42 | 33 | → | 36 | ↑ | 34 | 38 |
| 36~40 | → | → | → | → | ↑ | → | 44 | 46 | 48 | 40 | ↑ | → |
| 41~45 | ↑ | ↑ | ↑ | ↑ | 45 | ↑ | ↑ | ↑ | ↑ | ↑ | 47 | 49 |
| 46~50 | 51 | 52 | 53 | 54 | ↑ | 56 | 57 | 58 | 59 | 50 | ↑ | → |
| 51~55 | → | → | → | → | 55 | → | → | → | → | ↑ | ↑ | ↑ |
| 56~60 | ↑ | ↑ | ↑ | ↑ | ↑ | ↑ | ↑ | 69 | ↑ | 60 | 61 | 62 |
| 61~65 | 63 | 66 | 64 | 67 | 65 | 68 | 71 | → | 72 | ↑ | → | → |
| 66~70 | → | → | → | → | ↑ | ↑ | ↑ | ↑ | ↑ | 70 | ↑ | ↑ |
| 71~75 | 74 | 78 | 77 | 81 | 75 | 79 | 83 | 82 | 86 | ↑ | 73 | 76 |
| 76~80 | → | → | → | → | ↑ | → | → | → | → | 80 | ↑ | → |
| 81~85 | ↑ | ↑ | ↑ | ↑ | 85 | ↑ | ↑ | ↑ | ↑ | ↑ | 84 | 88 |
| 86~90 | 87 | 89 | 91 | 93 | 95 | 92 | 94 | 96 | 98 | 90 | ↑ | → |
| 91~95 | → | → | ↑ | ↑ | ↑ | ↑ | → | → | → | ↑ | 97 | 99 |
| 96~100 | ↑ | ↑ | | | | | | | | 100 | | |

→ OUTPUTTING DATA      ↓ HOLDING DATA

66b:

| CHANNEL NO. / SCANNING CYCLE COUNT | CH1 (B1) | CH2 (B3) | CH3 (B0) | CH4 (B2) | CH4 (B4) |
|---|---|---|---|---|---|
| 1 | X | X | X | X | X |
| 2 | X | X | 1 | 3 | 5 |
| 3 | 2 | 4 | 6 | 8 | 10 |
| 4 | 7 | 9 | 11 | 13 | 15 |
| 5 | 12 | 14 | 16 | 18 | 20 |
| 6 | 17 | 19 | 21 | 23 | 25 |
| 7 | 22 | 24 | 26 | 28 | 30 |
| 8 | 27 | 29 | 31 | 33 | 35 |
| 9 | 32 | 34 | 36 | 38 | 40 |
| 10 | 37 | 39 | 41 | 43 | 45 |
| 11 | 42 | 44 | 46 | 48 | 50 |
| 12 | 47 | 49 | 51 | 53 | 55 |
| 13 | 52 | 54 | 56 | 58 | 60 |
| 14 | 57 | 59 | 61 | 63 | 65 |
| 15 | 62 | 64 | 66 | 68 | 70 |
| 16 | 67 | 69 | 71 | 73 | 75 |
| 17 | 72 | 74 | 76 | 78 | 80 |
| 18 | 77 | 79 | 81 | 83 | 85 |
| 19 | 82 | 84 | 86 | 88 | 90 |
| 20 | 87 | 89 | 91 | 93 | 95 |

FIG. 9

EXPOSURE SCANNING SEQUENCE TABLE — F

| SCANNING CYCLES | CH (BEAM) | --→ NON-EXPOSURE<br>—→ EXPOSURE | SCANNING LINE NO. |
|---|---|---|---|
| 1 | 1 | --→ | |
| 1 | 2 | --→ | |
| 1 | 3 | --→ | |
| 2 | 1 | --→ | |
| 1 | 4 | --→ | |
| 2 | 2 | --→ | |
| 1 | 5 | --→ | |
| 2 | 3 | —→ | 1 |
| 3 | 1 | —→ | 2 |
| 2 | 4 | —→ | 3 |
| 3 | 2 | —→ | 4 |
| 2 | 5 | —→ | 5 |
| 3 | 3 | —→ | 6 |
| 4 | 1 | —→ | 7 |
| 3 | 4 | —→ | 8 |
| 4 | 2 | —→ | 9 |
| 3 | 5 | —→ | 10 |
| 4 | 3 | —→ | 11 |
| 5 | 1 | —→ | 12 |
| 4 | 4 | —→ | 13 |
| 5 | 2 | —→ | 14 |
| 4 | 5 | —→ | 15 |
| 5 | 3 | —→ | 16 |
| 5 | 4 | —→ | 18 |
| 5 | 5 | —→ | 20 |

IMAGE SCANNING AND RECORDING APPARATUS

BACKGROUND OF THE INVENTION

1. Field of the Invention

The present invention relates to an image scanning and recording apparatus for use in a printer, an imagesetter, or the like for scanning an image recording medium such as a print paper or film fed in an auxiliary scanning direction with a plurality of light beams in a main scanning direction for simultaneously recording a plurality of scanning line image data on the image recording medium.

2. Description of the Related Art

There has been known a multibeam scanning and recording apparatus for simultaneously recording a plurality of scanning line image data on a photosensitive material such as a film or the like, which serves as an image recording medium that is continuously fed in an auxiliary scanning direction, with multiple beams. The multibeam scanning and recording apparatus is advantageous over conventional single-beam scanning and recording apparatus in that it can record images at a higher speed on the photosensitive material.

There are available two multibeam scanning and recording processes. One process is an n-beam noninterlaced simultaneous scanning and recording process by which images are simultaneously recorded on a photosensitive material with n beams on the noninterlaced principle. The other process is an n-beam interlaced simultaneous scanning and recording process by which images are simultaneously recorded on a photosensitive material with n beams on the interlaced principle.

Figure 10:
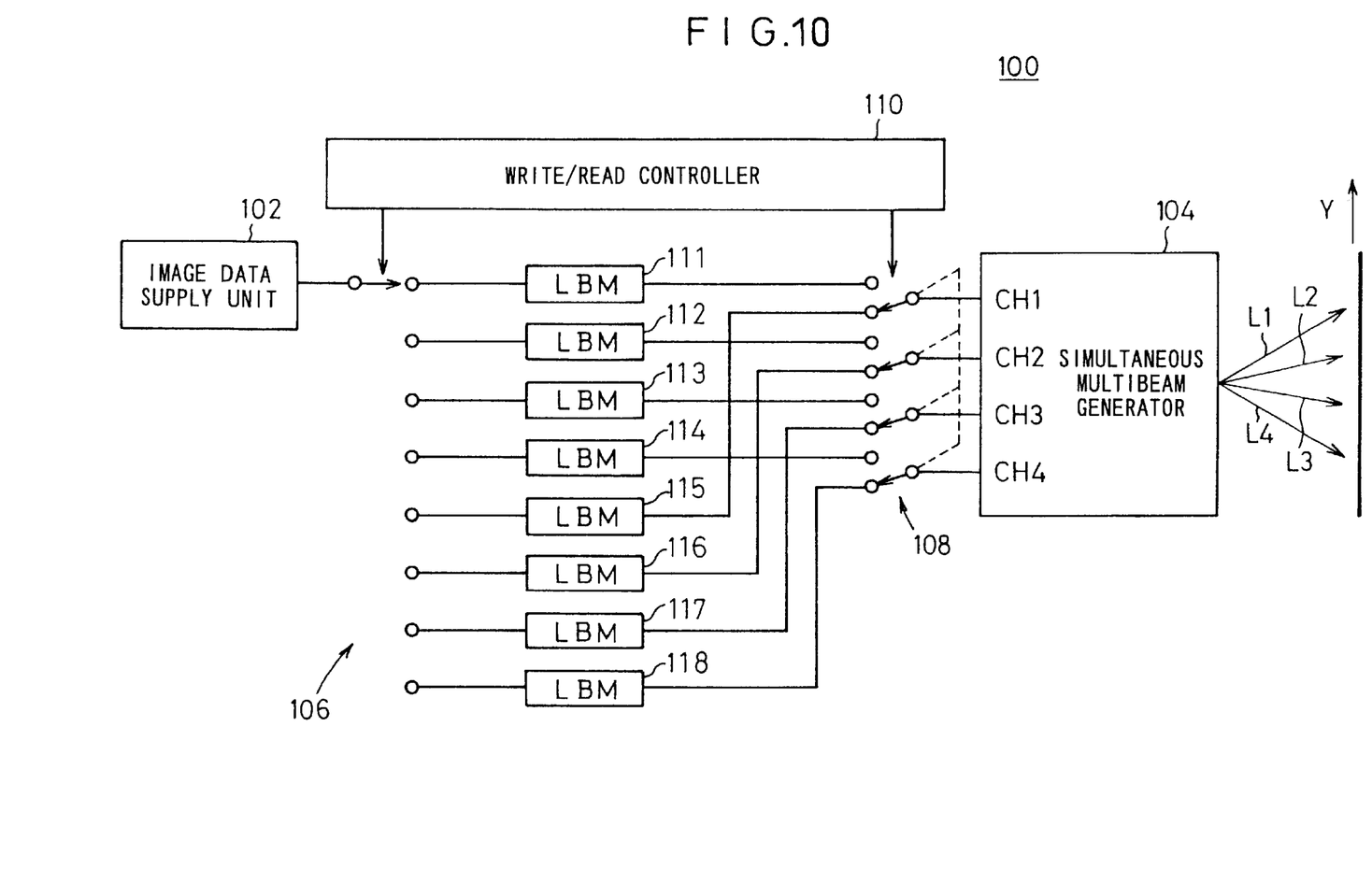
FIG. 10 is a block diagram of an image scanning and recording apparatus which incorporates a 4-beam noninterlaced simultaneous scanning and recording process.

FIG. 10 of the accompanying drawings schematically shows an image scanning and recording apparatus 100 based on the 4-beam noninterlaced simultaneous scanning and recording process.

As shown in FIG. 10, the image scanning and recording apparatus 100 basically comprises an image data supply unit 102 for supplying lines of data successively from a first scanning line in the sequence of scanning line numbers, 8 line buffers (LBM) 111–118 for storing respective lines of data, and a simultaneous multibeam generator 104 for simultaneously generating recording beams L1–L4 corresponding to line data supplied to channels CH1–CH4.

A data writing selector 106 is inserted between the image data supply unit 102 and input terminals of the line buffers 111–118, and a data reading selector 108 is inserted between output terminals of the line buffers 111–118 and the simultaneous multibeam generator 104. Contacts of the data writing selector 106 and the data reading selector 108 are switched by a write/read controller 110.

The write/read controller 110 successively switches the data writing selector 106 to write first through fourth lines of data into the line buffers 111–114 in synchronism with a first recording scan {at this time, the photosensitive material F fed in the auxiliary scanning direction (indicated by the arrow Y) is exposed to no recording beams because no line data are supplied to the simultaneous multibeam generator 104.

In a next recording scan, the write/read controller 110 switches the data reading selector 108 to connect the channels CH1–CH4 of the simultaneous multibeam generator 104 respectively to the line buffers 111–114. The first through fourth lines of data are simultaneously read from the line buffers 111–114 into the simultaneous multibeam generator 104, which generates and apply recording beams L1–L4 simultaneously to the photosensitive material F. At the same time that the photosensitive material F is simultaneously exposed to the recording beams L1–L4, the write/read controller 110 successively switches the data writing selector 106 to write fifth through eighth lines of data into the line buffers 111–114 for another next recording scan.

The above operation is repeated to record successive sets of four lines of image data on the photosensitive material F.

The n-beam noninterlaced simultaneous scanning and recording process as described above is able to control the writing of image data into and the reading of image data from the line buffers highly simply.

However, when n lines of image data are simultaneously formed on a photosensitive material by the n-beam noninterlaced simultaneous scanning and recording process, images reproduced from the photosensitive material sometimes suffer density irregularities and image fluctuations.

These problems could be solved by the n-beam interlaced simultaneous scanning and recording process. However, there has been established no process for writing image data into and reading image data from line buffers for the n-beam interlaced simultaneous scanning and recording process.

SUMMARY OF THE INVENTION

It is therefore an object of the present invention to provide an image scanning and recording apparatus which incorporates a process for writing image data into and reading image data from line buffers for the n-beam interlaced simultaneous scanning and recording process.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
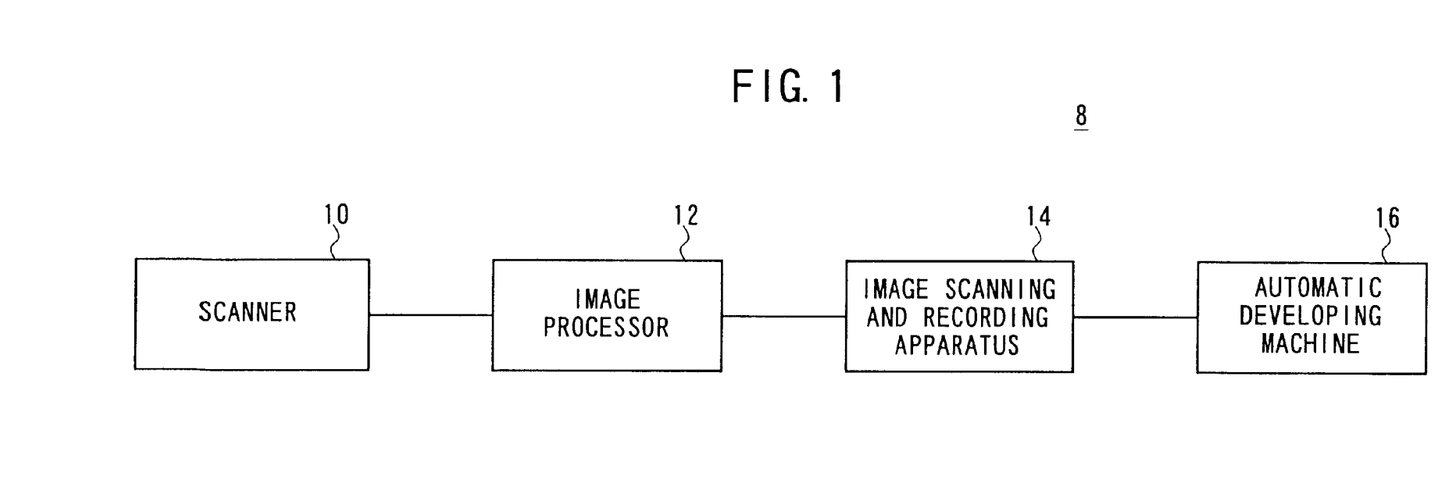
FIG. 1 is a block diagram of an image input and output system which includes an image scanning and recording apparatus according to the present invention.

FIG. 1 shows in block form an image input and output system 8 which includes an image scanning and recording apparatus 14 according to the present invention.

As shown in FIG. 1, the image input and output system 8 comprises a scanner 10 for reading a subject image to generate lines of image data (also referred to as line data or scanning line image data), an image processor 12 for processing the generated line data and outputting the processing line data as raster image data, an image scanning and recording apparatus 14 for forming images of C (cyan), M (magenta), Y (yellow), and K (black) on respective films (photosensitive materials) as image recording mediums based on the raster image data, and an automatic developing machine 16 for developing the formed images on the films. Printing plates are produced from the developed images on the films, and a desired colored print is generated by a printing press using the printing plates.

Figure 2:
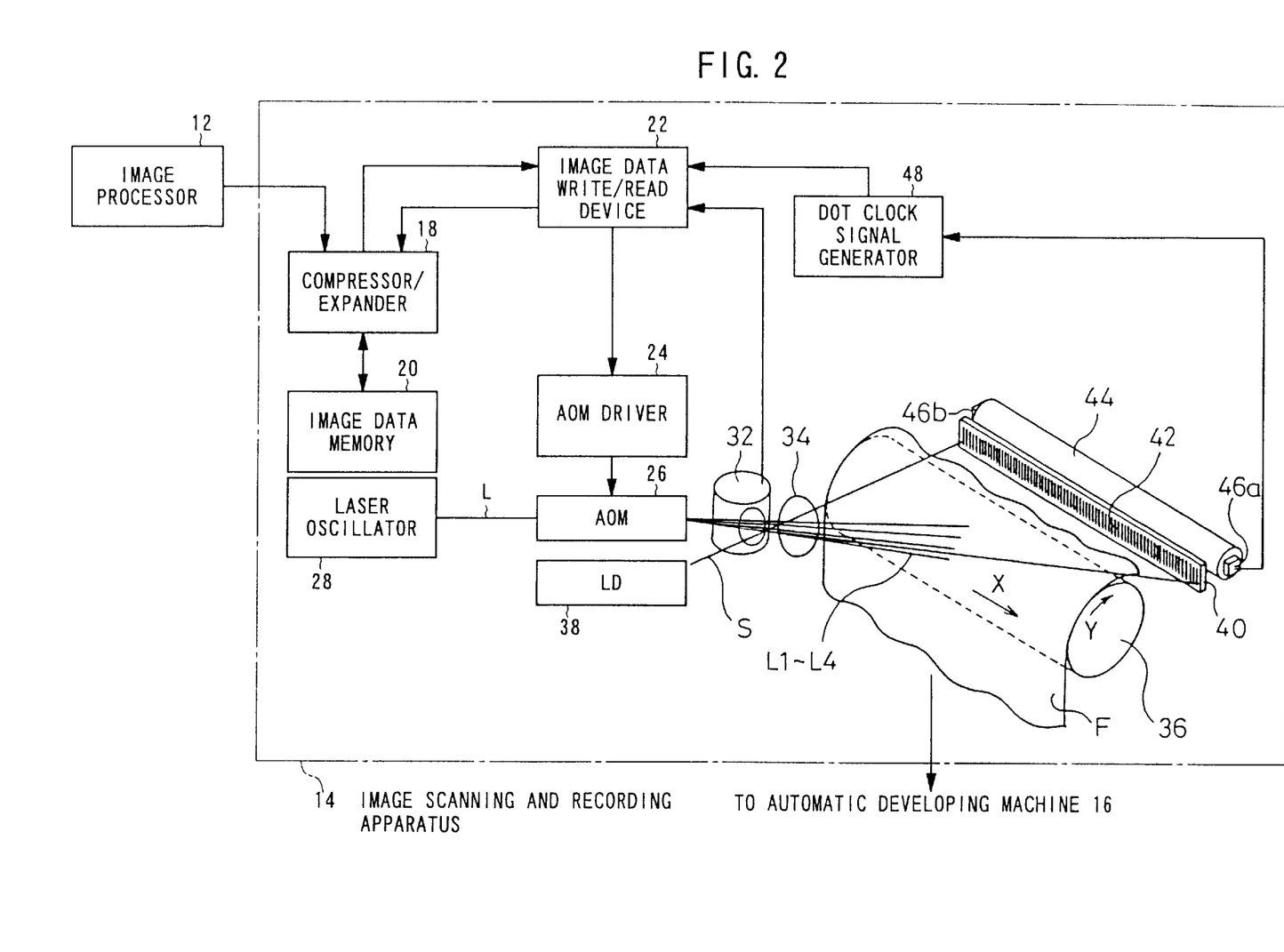
FIG. 2 is a block diagram of the image scanning and recording apparatus shown in FIG. 1.

FIG. 2 shows in detail the image scanning and recording apparatus 14. The image scanning and recording apparatus 14 has a compressor/expander 18 for compressing or expanding line data. The compressor/expander 18 compresses line data supplied from the image processor 12 and supplies the compressed line data to an image data memory 20, and expands line data stored in the image data memory 20 and outputs the expanded line data to an image data write/read device 22.

Line data are successively transferred, one line data at a time, from the image data memory 20 to the image data write/read device 22 in the sequence of scanning line numbers. Specifically, first line data, second line data, third line data, . . . are successively transferred from the image data memory 20 to the image data write/read device 22. Similarly, line data are successively transferred, one line data at a time, from the image processor 12 to the image scanning and recording apparatus 14 in the sequence of scanning line numbers.

The image data write/read device 22 has a plurality of line buffers (described later on) and supplies scanning line synchronizing signals (also referred to as line synchronizing signals) to the compressor/expander 18. The image data write/read device 22 simultaneously outputs four lines of data which have successively been supplied through the compressor/expander 18 to an acoustooptic modulator driver 24 in synchronism with the line synchronizing signal.

The acoustooptic modulator driver 24 supplies four high-frequency signals corresponding to the supplied four line data to an acoustooptic modulator (AOM) 26, which serves as a simultaneous plural recording beam generator, to enable the acoustooptic modulator 26 to divide a laser beam L from a laser oscillator 38 into four recording beams (also referred to as light beams or laser beams) L1–L4. The recording beams L1–L4 are turned on or off depending on whether there is a high-frequency signal or not, in other words, whether there is line data or not, i.e., whether there is pixel data of line data (value 1) or not (value 0).

The four recording beams L1–L4 outputted by the acoustooptic modulator 26 are deflected by a resonant scanner 32 and a scanning lens 34, which jointly make up a light deflector, to simultaneously scan a film F as an image recording medium in a main scanning direction indicated by the arrow X. At this time, the film F is fed in an auxiliary scanning direction indicated by the arrow Y by a drum 36 that is rotated at a constant speed by a motor (not shown) under servo control.

Therefore, a two-dimensional image represented by the line data is recorded on the film F by the recording beams L1–L4 which scan the film F in the main scanning direction while the film F is being fed in the auxiliary scanning direction.

The image on the film F is then developed by the automatic developing machine 16, and will be used to generate a printing plate.

A synchronizing laser beam (synchronizing beam) S emitted from a synchronizing laser diode 38 is applied to the resonant scanner 32. The synchronizing beam S is applied through the scanning lens 34 to a reference grid plate 40. The reference grid plate 40 has a plurality of successive slits 42 and is elongate in the main scanning direction. A light guide rod 44 is disposed behind the reference grid plate 40. The synchronizing beam S applied to the reference grid plate 40 passes through the slits 42 into the light guide rod 44. The synchronizing beam S is repeatedly reflected in the light guide rod 44 and led to photodiodes 46a, 46b disposed respectively on the opposite ends of the light guide rod 44. The light guide rod 44 converts the synchronizing beam S into electric signals which are added to each other by an adder (not shown). The sum signal is then supplied as a pulse signal to a dot clock signal generator (synchronizing signal generator) 48.

The dot clock signal generator 48 multiplies the pulse signal with a PLL (phase-locked loop) to produce a dot clock signal, which is supplied to the image data write/read device 22.

A drive signal for the resonant scanner 32 is supplied as a scanning synchronizing signal (scanning cycle count signal) from the resonant scanner 32 to the image data write/read device 22.

Figure 3:
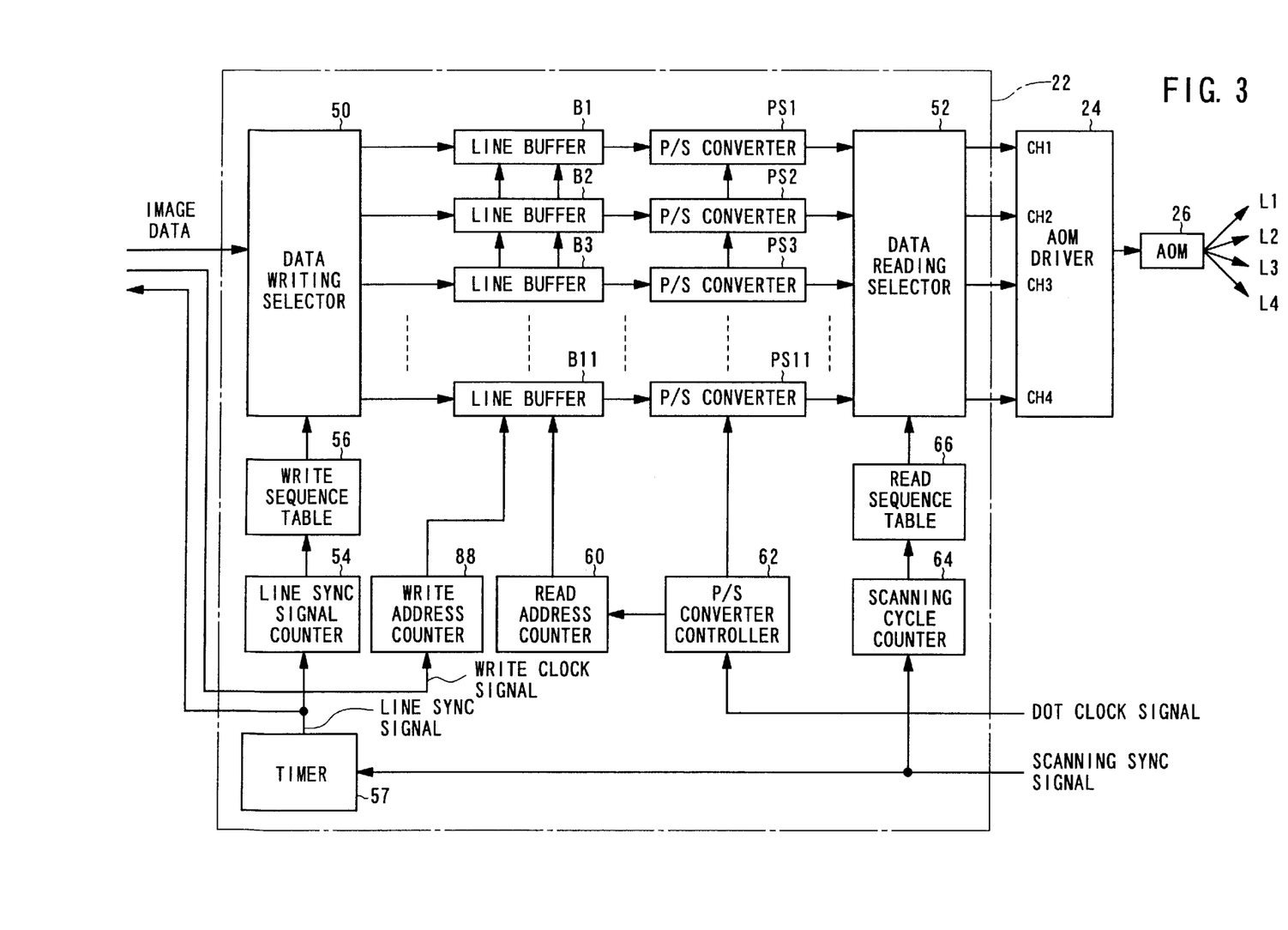
FIG. 3 is a block diagram of an image data write/read device shown in FIG. 2.

FIG. 3 shows in detail the image data write/read device 22. The image data write/read device 22 has eleven line buffers B1–B11 comprising SRAMs or the like, for storing line data (image data) supplied from the compressor/expander 18, a data writing selector 50 for selecting one of the line buffers B1–B11 at a time, eleven P/S (parallel-to-serial) converters PS1–PS11 for converting line data from the line buffers B1–B11 from a parallel signal (parallel data) into a serial signal (serial data), and a data reading selector 52 for selecting four lines of data from the P/S converters PS1–PS11 and supplying the selected lines of data to channels CH1–CH4 of the acoustooptic modulator driver 24.

As described later on, eleven line buffers are required by a 4-beam interlaced simultaneous scanning process, seven line buffers by a 3-beam interlaced simultaneous scanning process, and twelve line buffers by a 5-beam interlaced simultaneous scanning process.

Addresses for reading line data from the line buffers B1–B11 and addresses for writing line data into the line buffers B1–B11 are generated respectively by a write address counter 88 and a read address counter 60.

The data writing selector 50 distributes line data (first line data, second line data, third line data, . . . ) supplied from the compressor/expander 18 in the sequence of scanning lines (first scanning line, second scanning, third scanning line, . . . ), i.e., to the line buffers B1–B11 according to a switching control signal outputted from a write sequence table 56 in the form of a memory such as a ROM or the like based on a count signal (also referred to as a line synchronizing signal count or a timing signal) from a scanning line synchronizing signal counter (also referred to as a line synchronizing signal counter) 54.

The line synchronizing signal counter 54 has an input terminal connected to a timer 57 which generates four line synchronizing signals in response to a scanning synchronizing signal (scanning cycle count signal) supplied from the resonant scanner 32. The line synchronizing signals are also supplied from the image data write/read device 22 to the compressor/expander 18.

The P/S converters PS1–PS11 is controlled in operation by a P/S converter controller 62 which operates in response to a dot clock signal supplied from the dot clock signal generator 48.

The data reading selector 52 selects four lines of data from the P/S converters PS1–PS11 according to a read sequence which is read from a read sequence table 66 in the form of a memory such as a ROM or the like based on a scanning cycle count from a scanning cycle counter 64 which counts scanning synchronizing signals as drive signals for the resonant scanner 32.

The read address counter 60 updates a read address each time 16 dot clock pulses are supplied from the P/S converter controller 62. In this embodiment, each word in the line buffers B1–B11 comprises two bytes=16 bits.

The acoustooptic modulator driver 24 controls the acoustooptic modulator 26 to generate four recording beams L1–L4 in response to four line data that are supplied from the data reading selector 52 to the acoustooptic modulator driver 24.

In FIG. 3, the write sequence table 56 and the read sequence table 66 jointly make up a write/read controller for the line buffers B1–B11.

Figure 4:
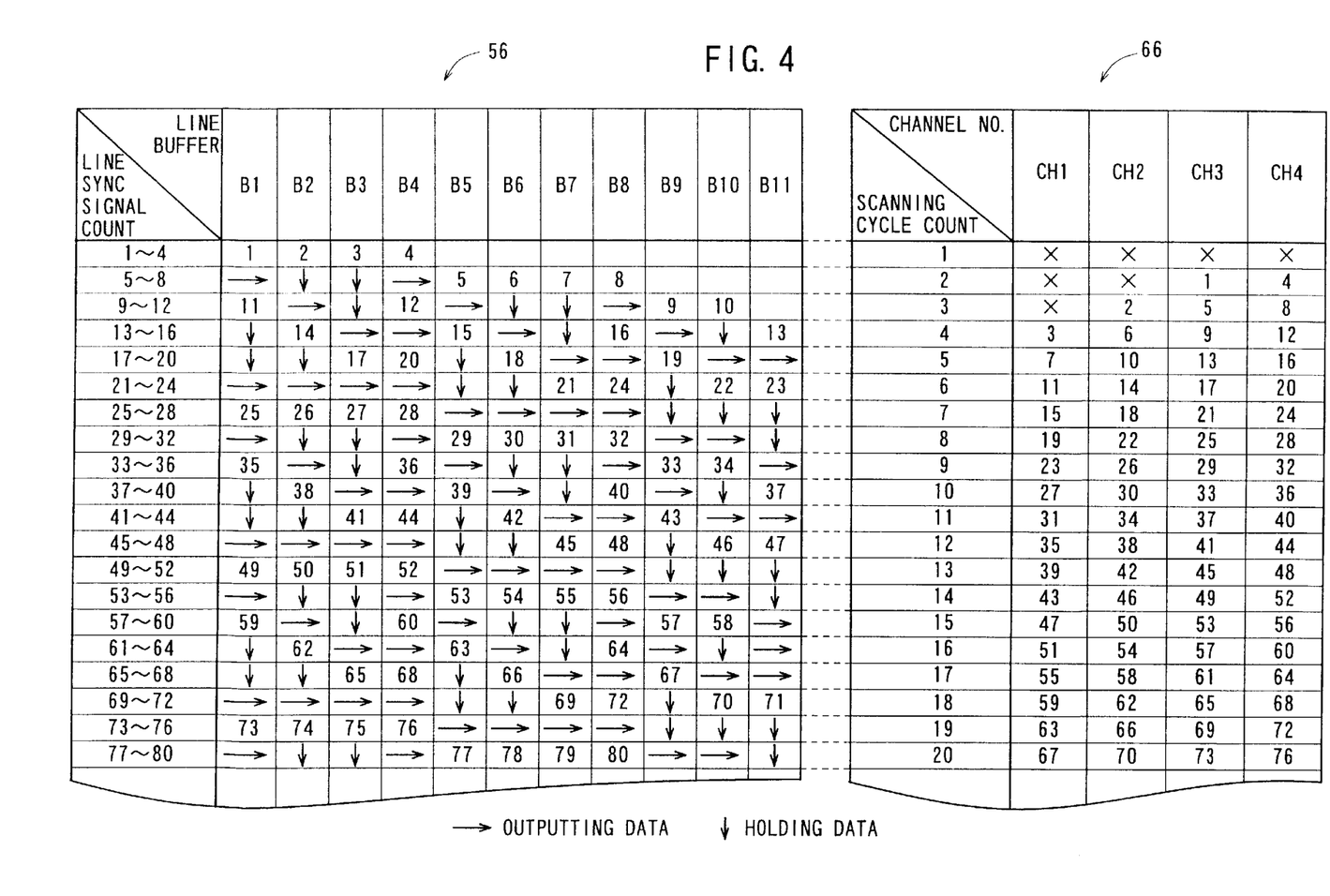
FIG. 4 is a diagram showing a write sequence table and a read sequence table according to a 4-beam interlaced simultaneous scanning process.

FIG. 4 shows in its left-hand side the write sequence table 56 according to the 4-beam interlaced simultaneous scanning process. The write sequence table 56 indicates that successive line data are sequentially stored into the line buffers, i.e., first line data is stored into the line buffer B1 when the line synchronizing signal counter 54 produces a count 1, second line data is stored into the line buffer B2 when the line synchronizing signal counter 54 produces a count 2, third line data is stored into the line buffer B3 when the line synchronizing signal counter 54 produces a count 3, and fourth line data is stored into the line buffer B4 when the line synchronizing signal counter 54 produces a count 4. As described later on, those line buffers B1–B11 which correspond to the downward arrow "↓" in the write sequence table 56 indicate that they are holding line data, and those line buffers B1–B11 which correspond to the rightward arrow "→" in the write sequence table 56 indicate that they are outputting line data.

FIG. 4 shows in its right-hand side the read sequence table 66, which corresponds to the write sequence table 56, according to the 4-beam interlaced simultaneous scanning process.

The read sequence table 66 indicates that when the scanning cycle counter 64 produces a count 4, i.e., when the recording beams L1–L4 simultaneously scan the film M for the fourth time, third line data stored in the line buffer B3 at the line synchronizing signal count 3 is supplied to the channel CH1 of the acoustooptic modulator driver 24, sixth line data stored in the line buffer B6 at the line synchronizing signal count 6 is supplied to the channel CH2 of the acoustooptic modulator driver 24, ninth line data stored in the line buffer B9 at the line synchronizing signal count 9 is supplied to the channel CH3 of the acoustooptic modulator driver 24, and twelfth line data stored in the line buffer B4 at the line synchronizing signal count 12 is supplied to the channel CH4 of the acoustooptic modulator driver 24, all simultaneously.

In response to the respective line data simultaneously supplied to the channels CH1–CH4, the acoustooptic modulator 26 simultaneously generates four recording beams L1–L4. As can be understood from the write sequence table 56 shown in FIG. 4, a unit control cycle for writing line data into and reading line data from each of the line buffers B1–B11 is effected over six scanning cycles, and is repeated subsequently.

The relationship between the operation of the line buffers B1–B11 to write and read line data for exposing the film F according to interlaced scanning to the four recording beams L1–L4 simultaneously generated by the acoustooptic modulator 26 and an interlaced scanning sequence (exposure sequence) will be described below with reference to an exposure scanning sequence table shown in FIG. 5.

When the resonant scanner 32 is actuated in a scanning period, a drive signal for starting one scanning cycle of the resonant scanner 32 is supplied as a scanning synchronizing signal to the scanning cycle counter 64 and the timer 57. The scanning cycle counter 64 produces a count 1, and the timer 57 successively generates first through fourth line synchronizing signals in one scanning period. That is, four line synchronizing signals are successively generated in response to one scanning synchronizing signal.

When the first line synchronizing signal is supplied to the line synchronizing signal counter 54, the data writing selector 50 is connected to the line buffer B1 by an output signal from the write sequence table 56, and the line buffer B1 stores first line data at an address generated by the write address counter 88.

Similarly, the line buffers B2–B4 successively store second through fourth line data, respectively, according to respective output signals from the write sequence table 56 based on counts of the line synchronizing signal counter 54 which count second through fourth line synchronizing signals.

When the scanning cycle counter 64 produces the count 1, i.e., when the scanning cycle is the first cycle (first simultaneous scanning), since no line data have been stored in the line buffers B1–B11, the acoustooptic modulator driver 24 does not energize the acoustooptic modulator 26. Therefore, in the first scanning cycle, the film F is not exposed and does not record any image as indicated by dotted-line arrows (indicative of non-exposure) corresponding to the first scanning cycle in FIG. 5.

Figure 5:
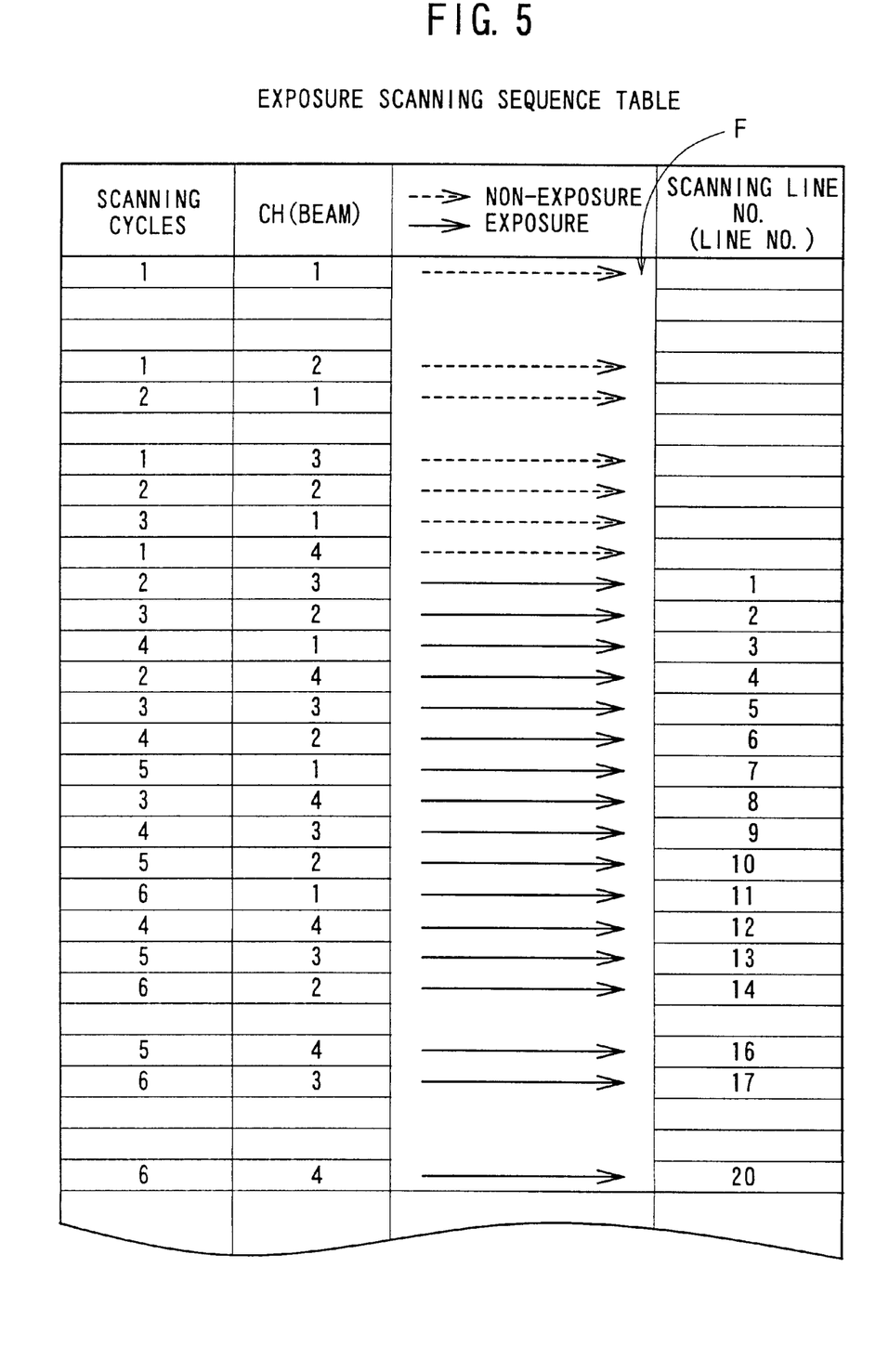
FIG. 5 is a diagram showing an exposure scanning sequence table according to the 4-beam interlaced simultaneous scanning process.

In FIG. 5, the leftmost column represents scanning cycles, the second column to the leftmost column represents channels (CH), and the third column to the leftmost column represents scanning lines shown by dotted-line arrows indicative of non-exposure and solid-line arrows indicative of exposure. Successive scanning positions on the film F are represented by vertical positions in the third column, with the uppermost position being a start-of-recording position and the lowermost position being an end-of-recording position. The rightmost column in FIG. 5 represents scanning line numbers.

When the scanning cycle counter 64 produces a count 2 in a next scanning cycle of the resonant scanner 32 (second simultaneous scanning), fifth through eighth line data are stored respectively in the line buffers B5–B8 according to the write sequence table 56. According to the read sequence table 66, the first line data stored in the line buffer B1 is outputted to the channel CH3, and the fourth line data stored in the line buffer B4 is outputted to the channel CH4.

At this time, the line data are simultaneously recorded on the film F respectively at the first and second scanning lines by the recording beams L3, L4 corresponding to the channels CH3, CH4. No line data are recorded on the film F by the recording beams L1, L2 corresponding to the channels CH1, CH2.

When the scanning cycle counter 64 produces a count 3 (third simultaneous scanning), ninth through twelfth line data are stored respectively in the line buffers B9, B10 and the line buffers B1, B4 from which the line data have been outputted in the previous scanning cycle, according to the write sequence table 56. According to the read sequence table 66, the second, fifth, and eighth line data stored in the line buffers B2, B5, B8 are read and simultaneously recorded on the film F at the second, fifth, and eighth scanning lines by the recording beams L2, L3, L4. At this time, the second line data is recorded in a scanning position next to the already recorded first line data, the fifth line data is recorded in a scanning position next to the already recorded fourth line data, and the eighth line data is recorded in a scanning position next to a seventh scanning line which has not yet been recorded. No line data is recorded on the film F by the recording beam L corresponding to the channel CH1. Each time the film F is simultaneously scanned by four recording beams, the film F is fed in the auxiliary scanning direction by a distance corresponding to four scanning lines.

When the scanning cycle counter 64 produces a count 4 (fourth simultaneous scanning), third, sixth, ninth, and twelfth line data are simultaneously recorded on the film F by the recording beams L1, L2, L3, L4 corresponding to the channels CH1–CH4. Similarly, line data up to the final scanning line are recorded on the film F.

As can be understood from FIG. 5, for recording image data from the first scanning line to the eleventh scanning line, or stated otherwise, if the start-of-scanning line data is the first line data and the end-of-scanning line data is the eleventh line data, then when the scanning cycle counter 64 produces a count 5 (fifth simultaneous scanning), no line data are recorded in third and sixteenth scanning positions corresponding to the channels CH3, CH4, and when the scanning cycle counter 64 produces a count 6, no line data are recorded in fourteenth, seventeenth, and twentieth scanning positions corresponding to the channels CH2, CH3, CH4.

According to the 4-beam interlaced simultaneous scanning process, the film F thus fed in the auxiliary scanning direction is simultaneously scanned in the main scanning direction in an interlaced scanning fashion by the four recording beams L1–L4 emitted from the acoustooptic modulator 26. Therefore, line data can easily be written into and read from the line buffers B1–B11 according to the write sequence table 56 and the read sequence table 66 which shows an exposure sequence (read sequence).

A general process of controlling the sequence of line data to be written into the line buffers and a general process of controlling the sequence of line data to be read from the line buffers will generally be described below.

The sequence of line data to be written into line buffers is governed by the following criteria 1–5:

Basis for the criteria: As many n image data (line data) as the number n of simultaneous recording beams are transferred, successively from first line data in a time series, to a data writing selector. When all the line data as the number of the recording beams are stored in line buffers, the stored line data are simultaneously read and supplied to respective n channels CH1–CHn of an AOM driver. The n line data are thus simultaneously recorded on a film in an interlaced scanning fashion. The sequential numbers of the n line data in the sequence transferred to the line buffers in respective scanning cycles are referred to as N (N=1, 2, ..., n).

Criterion 1: The line data of the sequential number 1 is stored in the line buffer which has stored line data of the channel CH1 that is recorded in a preceding scanning cycle.

Criterion 2: The line data of the sequential number 2 is stored in the line buffer which has stored line data of the channel CH2 that is recorded in a preceding scanning cycle.

Criterion 3: The line data of the sequential number 3 is stored in the line buffer which has stored line data of the channel CH3 that is recorded in a preceding scanning cycle.

Criterion 4: The line data of the sequential number 2 is stored in the line buffer which has stored line data of the channel CH4 that is recorded in a preceding scanning cycle.

Therefore, the line data of the sequential number N is stored in the line buffer which has stored line data of the channel CHN that is recorded in a preceding scanning cycle.

Criterion 5: If there is no line data of the channel CHN that is recorded in a preceding scanning cycle, line data are written in the sequence of the numbers of the line buffers.

The above description is concerned with the general process of controlling the sequence of line data to be written into the line buffers.

With respect to the sequence of line data to be read from the line buffers, the n line data stored in the line buffers are read as serial data and transferred to the channels CH1–CHn according to an interlaced exposure sequence. For the interlaced exposure sequence, the number of scanning lines in the auxiliary scanning direction per scanning cycle may be determined on a trial-and-error basis so as not to overlap exposed line data when simultaneous recording beams n are scanned in the interlaced scanning fashion (Exposure scanning sequence tables according to 3- and 5-beam interlaced simultaneous scanning processes will be described later on).

Once an exposure scanning sequence table is generated, i.e., once a read sequence table is generated, line data can be read in a unique sequence as described above.

A process of generating the write sequence table 56 shown in FIG. 4 based on the above criteria will be described below with reference to the write sequence table 56 and the read sequence table 66.

The first through fourth line data of the sequential numbers 1–4 transferred to line buffers in the first scanning cycle are stored in the line buffers B1–B4 in the sequence of their numbers according to the criterion 5 because there is no line data in the channels to be recorded in a preceding scanning cycle (the scanning cycle at the scanning cycle count 0).

Fifth through eighth line data of the sequential numbers 5–8 transferred to line buffers in the second scanning cycle are stored in the line buffers B5–B8 in the sequence of their numbers according to the criterion 5 because there is no line data in the channels to be recorded in a preceding scanning cycle (the scanning cycle at the scanning cycle count 1).

Ninth line data is line data of the sequential number 1 transferred to a line buffer for the third scanning cycle. Since no line data is exposed in the channel CH1 in a preceding scanning cycle (the scanning cycle at the scanning cycle count 2), the ninth line data is stored in the line buffer B9 having the sequential number 9 according to the criterion 5.

Tenth line data is line data of the sequential number 2 transferred to a line buffer for the third scanning cycle. Since no line data is exposed in the channel CH2 in a preceding scanning cycle (the scanning cycle at the scanning cycle count 2), the tenth line data is stored in the line buffer B10 having the sequential number 10 according to the criterion 5.

Eleventh line data is line data of the sequential number 3 transferred to a line buffer for the third scanning cycle. Since the line buffer which has stored the first line data exposed in the channel CH3 in a preceding scanning cycle (the scanning cycle at the scanning cycle count 2) is the line buffer B1, the eleventh line data is stored in the line buffer B1 according to the criterion 3.

Twelfth line data is line data of the sequential number 4 transferred to a line buffer for the third scanning cycle. Since the line buffer which has stored the fourth line data exposed in the channel CH4 in a preceding scanning cycle (the scanning cycle at the scanning cycle count 2) is the line buffer B4, the twelfth line data is stored in the line buffer B4 according to the criterion 4.

Thirteenth line data is line data of the sequential number 1 transferred to a line buffer for the fourth scanning cycle. Since no line data is exposed in the channel CH1 in a preceding scanning cycle (the scanning cycle at the scanning cycle count 3), the thirteenth line data is stored in the line buffer B11 having the sequential number 11 according to the criterion 5.

Fourteenth line data is line data of the sequential number 2 transferred to a line buffer for the fourth scanning cycle. Since the line buffer which has stored the second line data exposed in the channel CH2 in a preceding scanning cycle (the scanning cycle at the scanning cycle count 3) is the line buffer B2, the fourteenth line data is stored in the line buffer B2 according to the criterion 2.

As described above, the write sequence data 56 can be generated with reference to the criterion 1–5.

At the time the write sequence data 56 has been generated, the number of required line buffers becomes apparent. For the 4-beam noninterlaced simultaneous scanning and recording process, it is known that 11 line buffers B1–B11 are required.

As described above, the image scanning and recording apparatus 14 according to the 4-beam noninterlaced simultaneous scanning and recording process basically has the acoustooptic modulator (simultaneous four recording beam generator) 26 for simultaneously generating a plurality of recording beams for channels N (N=1–4) to record four line data simultaneously on the film (image recording medium) F in the main scanning direction (indicated by the arrow X) in an interlaced scanning fashion while the film F is being fed in the auxiliary scanning direction (indicated by the arrow Y), the 11 line buffers B1–B11 for supplying four line data for recording beams in the channels 1–4 (the channels CH1, CH2, CH3, CH4 of the acoustooptic modulator driver 24 in FIG. 3) to the acoustooptic modulator 26, and the write/read controller having the write sequence table 56 and the read sequence table 66 for controlling the writing of line data in and the reading of line data from the line buffers B1–B11. For writing line data, four line data corresponding to the four recording beams are transferred in the sequence of the numbers of the scanning lines in each scanning cycle. Assuming that the sequential numbers of the line data transferred in each scanning cycle are represented by N (N=1–4), if there is a line buffer which has stored line data in the channel N recorded in a preceding scanning cycle, then the line data having the sequential number N is written into that line buffer, and if there is no line data in the channel N recorded in a preceding scanning cycle, then the line data having the sequential number N is written into a line buffer according to the sequence. For reading line data, n line data stored in the line buffers are read and transferred respectively to the channels 1–4 of the acoustooptic modulator 26 (the channels CH1, CH2, CH3, CH4 of the acoustooptic modulator driver 24 in FIG. 3). By thus controlling the writing and reading of line data, the sequence of line data to be written into and the sequence of line data to be read from the line buffers B1–B11 of the image scanning and recording apparatus 14 according to the 4-beam noninterlaced simultaneous scanning and recording process can clearly be established.

Figure 6:
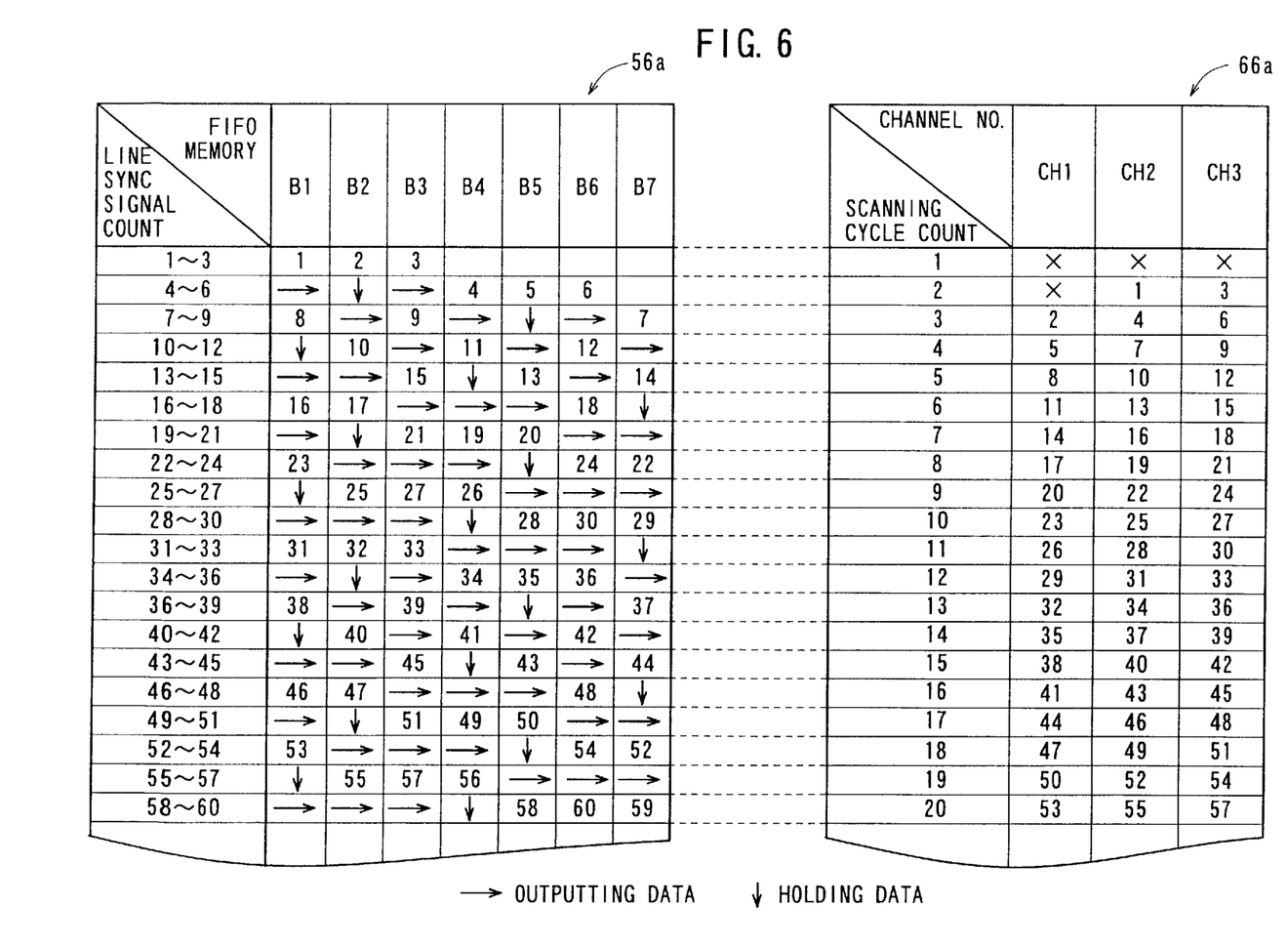
FIG. 6 is a diagram showing a write sequence table and a read sequence table according to a 3-beam interlaced simultaneous scanning process.

FIG. 6 shows a write sequence table 56a and a read sequence table 66a according to the 3-beam interlaced simultaneous scanning process. It should be noted in FIG. 6 that a unit control cycle for writing line data into and reading line data from each of the line buffers is effected over ten scanning cycles, and is repeated subsequently.

Figure 7:
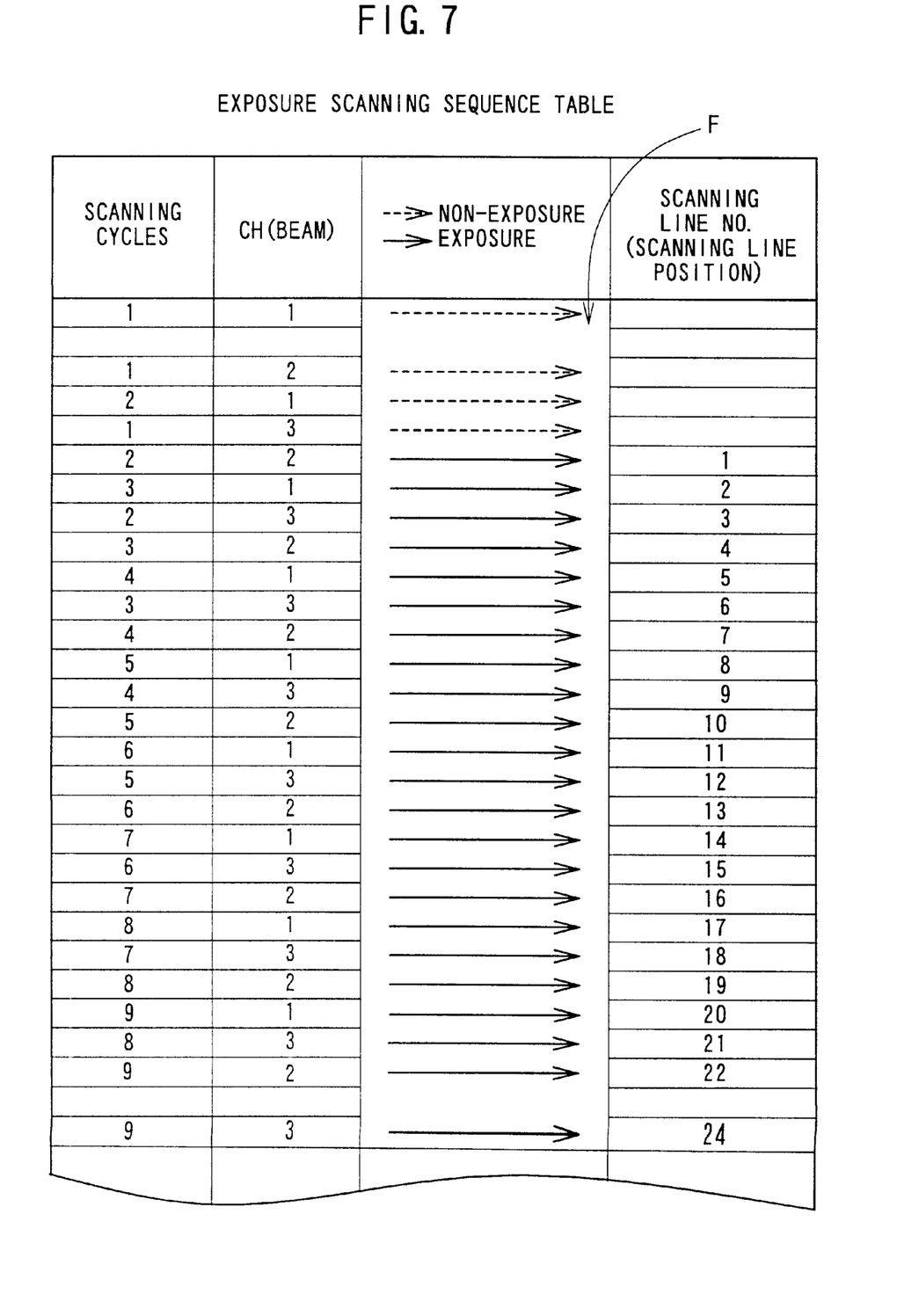
FIG. 7 is a diagram showing an exposure scanning sequence table according to the 3-beam interlaced simultaneous scanning process.

FIG. 7 shows an exposure scanning sequence table according to the 3-beam interlaced simultaneous scanning process.

It will be seen from FIGS. 6 and 7 that according to the 3-beam interlaced simultaneous scanning process, the film F may be fed in the auxiliary scanning direction by a distance corresponding to three scanning lines each time the film F is simultaneously scanned by three recording beams in one scanning cycle. In the 3-beam interlaced simultaneous scanning process, it is possible to establish a sequence of line data to be written into and a sequence of line data to be read from seven line buffers B1–B7 with the write sequence table 56a and the read sequence table 66a.

Figure 8:
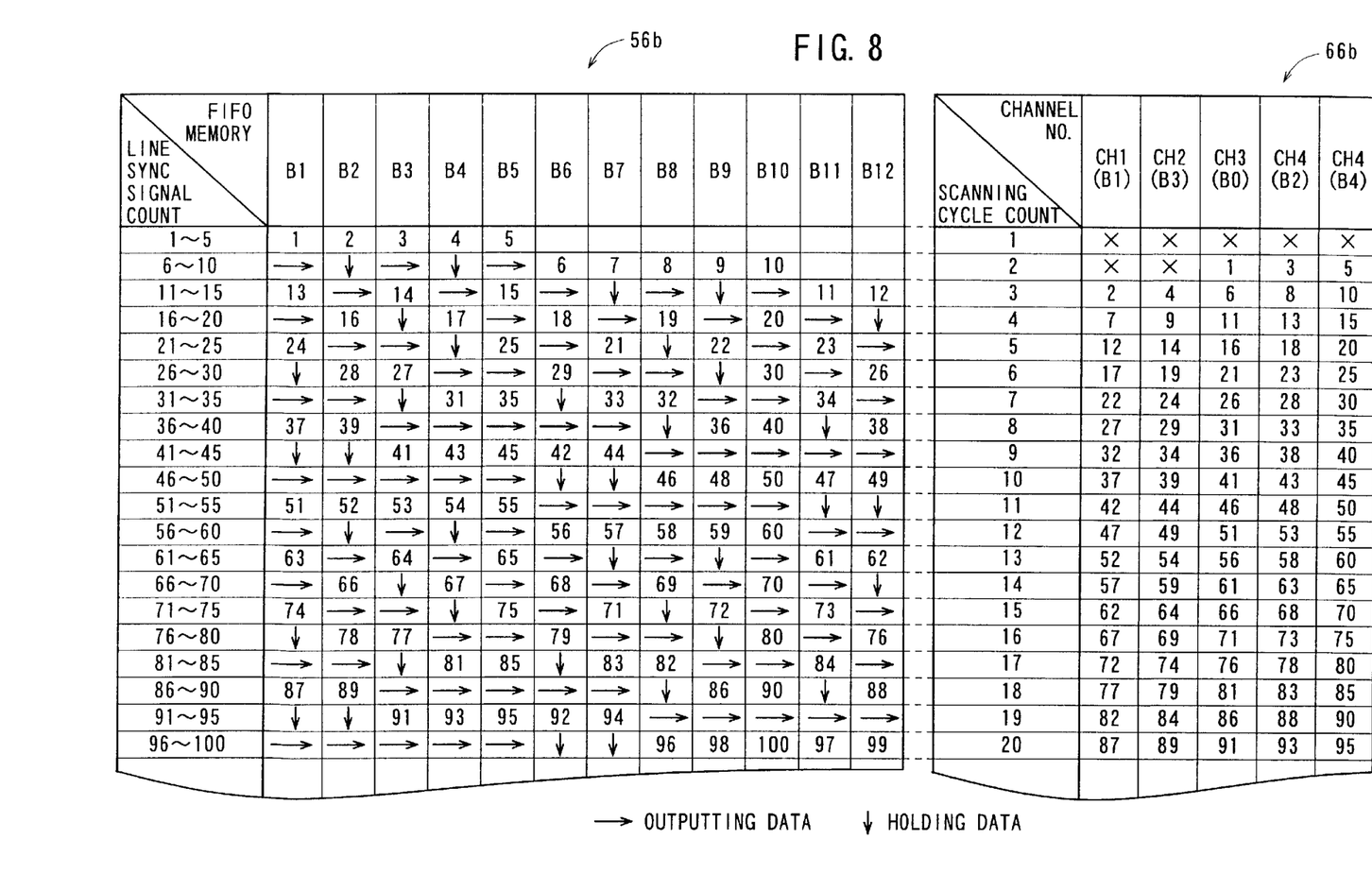
FIG. 8 is a diagram showing a write sequence table and a read sequence table according to a 5-beam interlaced simultaneous scanning process.

FIG. 8 shows a write sequence table 56b and a read sequence table 66b according to the 5-beam interlaced simultaneous scanning process. It should be noted in FIG. 8 that a unit control cycle for writing line data into and reading line data from each of the line buffers is effected over ten scanning cycles, and is repeated subsequently.

Figure 9:
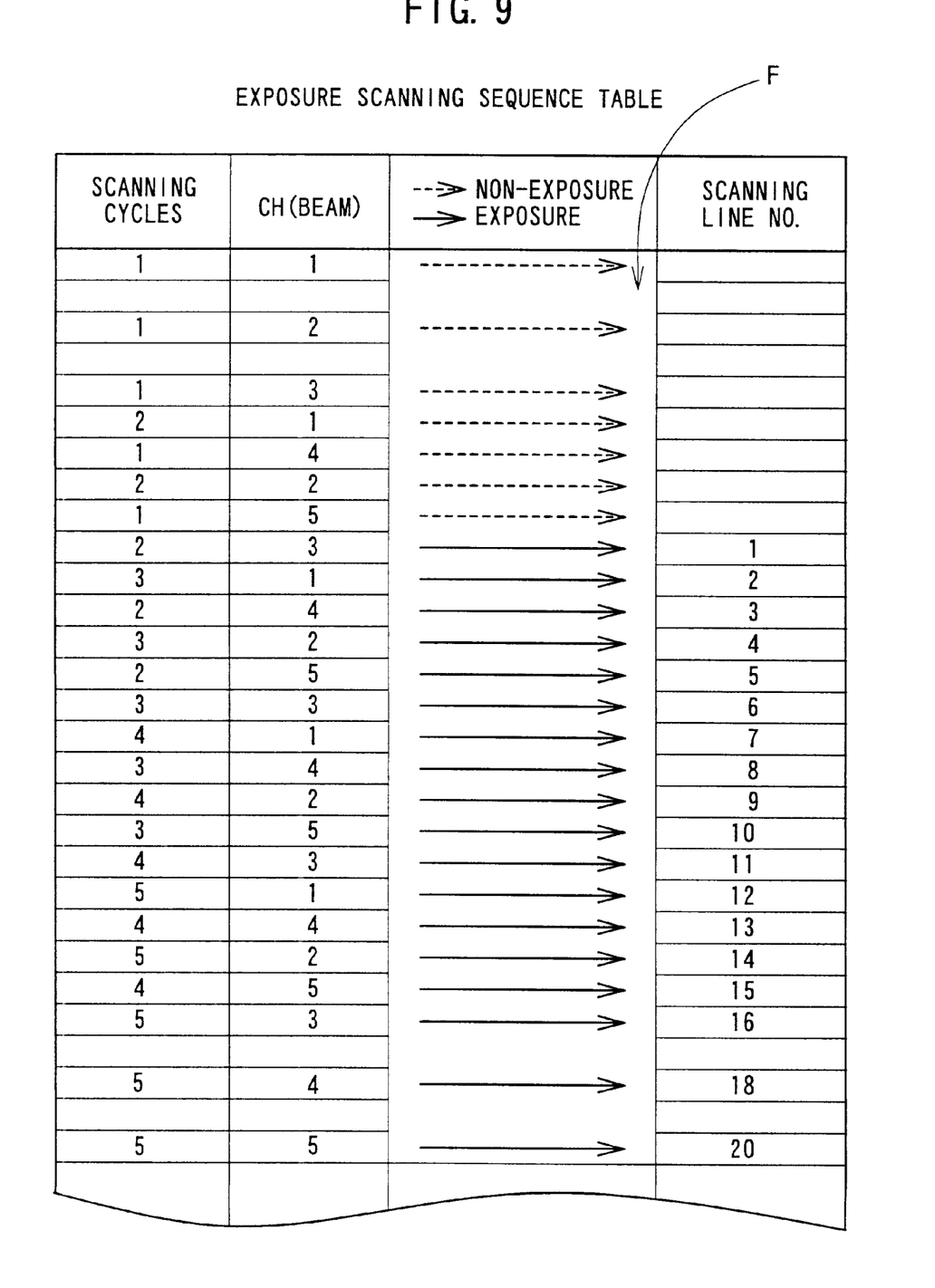
FIG. 9 is a diagram showing an exposure scanning sequence table according to the 5-beam interlaced simultaneous scanning process.

FIG. 9 shows an exposure scanning sequence table according to the 5-beam interlaced simultaneous scanning process.

It will be seen from FIGS. 8 and 9 that according to the 5-beam interlaced simultaneous scanning process, the film F may be fed in the auxiliary scanning direction by a distance corresponding to five scanning lines each time the film F is simultaneously scanned by five recording beams in one scanning cycle. In the 5-beam interlaced simultaneous scanning process, it is possible to establish a sequence of line data to be written into and a sequence of line data to be read from twelve line buffers B1–B12 with the write sequence table 56b and the read sequence table 66b.

Likewise, it is possible to establish a sequence of line data to be written into and a sequence of line data to be read from line buffers according to an interlaced simultaneous scanning process using six or more beams, based on the above criteria.

According to the present invention, as described above, it is possible to establish a sequence of line data to be written into and a sequence of line data to be read from line buffers a multibeam interlaced simultaneous scanning and recording process.

Because of the multibeam interlaced simultaneous scanning and recording process, a recorded image has a uniform density in the auxiliary scanning direction, and is free from image fluctuations.

Although certain preferred embodiments of the present invention have been shown and described in detail, it should be understood that various changes and modifications may be made therein without departing from the scope of the appended claims.

What is claimed is:

1. An image scanning and recording apparatus comprising:
   a simultaneous plural recording beam generator to generate recording beams for n channels for recording n lines of data simultaneously on an image recording medium in a main scanning direction in an interlaced scanning fashion, wherein n is a number>=3 and said n channels being numbered 1,2 . . . n;

a plurality of line buffers to supply the n lines of data to said simultaneous plural recording beam generator; and a write/read controller for controlling reading of said n lines of data from said plurality of line buffers simultaneously and writing of said n lines of data to said plurality of line buffers one line of data at a time successively in the sequence of scanning line numbers, wherein said write/read controller:
assigns a sequential number N (N=1,2 . . . n) in each scan cycle to n lines of data to be written in the sequence of scanning line numbers,
selects a line buffer from said plurality of line buffers for writing an Nth line of data (N=1,2 . . . n) using the following techniques:
a) the line buffer which has stored data read into an Nth channel in a previous scan cycle is selected for the Nth line of data if the line buffer is writable;
b) a next writable buffer is selected if a line buffer cannot be selected using technique (a),
writes the line of data to the selected buffer for an Nth line of data (N=1,2 . . . n) sequentially, and
effects a read process to simultaneously read n lines of data to be supplied to respective channels in an interlaced fashion and transfers the n lines of data to the n channels.

2. An image scanning and recording apparatus according to claim 1, wherein if the number of said recording beams is three, then the number of said line buffers is seven.

3. An image scanning and recording apparatus according to claim 1, wherein if the number of said recording beams is four, then the number of said line buffers is eleven.

4. An image scanning and recording apparatus according to claim 1, wherein if the number of said recording beams is five, then the number of said line buffers is twelve.

5. An image scanning and recording apparatus according to claim 1, wherein if the number of said recording beams is at least six, then the number of said line buffers is determined in order to perform said write process and said read process.

6. An image scanning and recording apparatus according to claim 1, wherein said simultaneous plural recording beam generator includes an acoustooptic modulator for modulating a light beam applied thereto with a plurality of frequency signals into said recording beams.

7. An image scanning and recording apparatus according to claim 1, wherein said write/read controller includes a memory storing said write process and said read process.

* * * * *